May 15, 1962          S. C. SCHANTZ          3,035,223

NULL BALANCE VOLTAGE SOURCE

Filed July 29, 1960

*INVENTOR.*
BY   Spencer C. Schantz

*ATTORNEY*

United States Patent Office 3,035,223
Patented May 15, 1962

3,035,223
NULL BALANCE VOLTAGE SOURCE
Spencer C. Schantz, Glassboro, N.J., assignor to The Budd Company, Philadelphia, Pa., a corporation of Pennsylvania
Filed July 29, 1960, Ser. No. 46,212
3 Claims. (Cl. 323—75)

This invention pertains to a long life infinite resolution null balance voltage source and, more particularly, to such a device employing variably deformed bonded resistance strain gauges as the variable resistance elements.

The operating characteristics of many electric and electronic circuits require a precisely calibrated voltage source for instrumenting null balance techniques; prime examples are null balance servo systems. Conventional potentiometers employed therein generally comprise a wound or elongated resistance element and a movable wiper or contact electrode. The resistance element is connected across a voltage source and a variable portion of the potential developed across the resistance element is selected according to the position of the wiper. Relative motion of the wiper against the resistance element results in wear, eventual non-linearity, and failure. The wear is greatly accelerated in servo applications where the wiper is positioned automatically because hunting oscillations can never be completely eliminated.

Therefore, it is an object of this invention to provide an improved null balance source which obviates abrasion of resistance elements.

A more specific object is to provide an improved null balance voltage source which obviates resistance element abrasion and is further adapted for backlash elimination, temperature stability, and infinite resolution while yielding calibrated voltages precisely related to mechanical displacements.

The above and further objects and advantages are obtained according to this invention by a null balance voltage source comprising a discontinuous cylindrical band, a plurality of circumferentially oriented resistance strain gauges bonded to surfaces of the band and mechanical means altering the radius of curvature of the band in response to externally generated mechanical displacements, whereby resistance of the gauges varies proportionately with the mechanical displacements.

While this invention is best defined in the appended claims a better understanding will be had upon consideration of the following description taken in conjunction with the accompanying drawing wherein:

Figure 1:
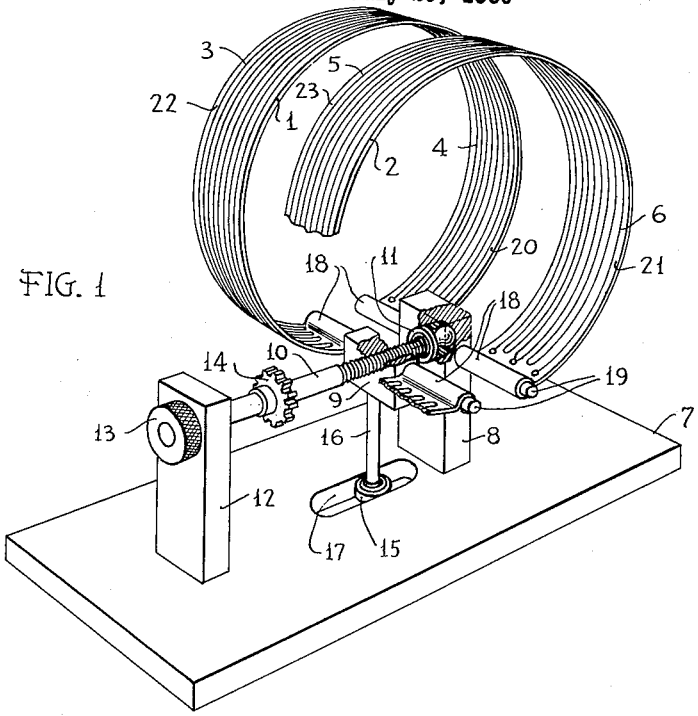
FIG. 1 is a perspective illustration of a null balance voltage source according to this invention.

The illustrated embodiment of FIG. 1 of the null balance voltage source comprises similar discontinuous cylindrical bands 1 and 2 of a resilient material, spring steel for example, having resistance strain gauges 3, 4, 5, and 6 bonded circumferentially thereto. A mechanically responsive means for deforming bands 1 and 2 is mounted on a base 7 and includes fixed block 8, movable block 9, and a displacement shaft 10. The latter threadedly engages movable block 9, is fixed against longitudinal movement by a thrust bearing assembly 11 in fixed block 8, and is further supported by pillow block 12. The shaft 10 may be manually rotated by means of a knob 13 or mechanically, through a suitable gearing represented at 14, by a servo mechanism output. Movable block 9 is stabilized against rotation by means of a bearing 15 on depending strut 16, which cooperates with longitudinal slot 17 defined in base 7.

Bands 1 and 2 are provided with integral cylindrical end portions 18 fitted closely around cooperating pins 19 extended laterally from blocks 8 and 9. The end portions 18 are free to rotate about pins 19 in this example. In some cases, however, the end portions 18 may be rigidly attached to pins 19 or to blocks 8 and 9.

It will be apparent that rotation of shaft 10 will cause relative translation of blocks 8 and 9 and alteration of the radii of curvature of bands 1 and 2. Changing the radius of curvature of a band results in a regular deformation, strain, of its surface. Increase of radius of curvature causes a circumferential tensile strain of internal surfaces 20 and 21 and a corresponding opposite, compressive, strain of external surfaces 22 and 23.

Before continuing to explanation of resistance variation of gauges 3 to 6, a unique feature of the displacement means should be emphasized. Backlash is understood as the distance through which one part of a mechanically connected assembly can be moved without moving connecting parts.

This source of error may be obviated completely according to this invention. In the preferred embodiment, each band is configured so that the separation between its ends when the band is unstressed is greater or less than any relative displacement enforced over the operating range of the device. Therefore, an initial biasing force causes each of the mechanically connected elements to be constrained in contact at the same surfaces without dependence upon external mechanical inputs and backlash is eliminated.

Figure 2:
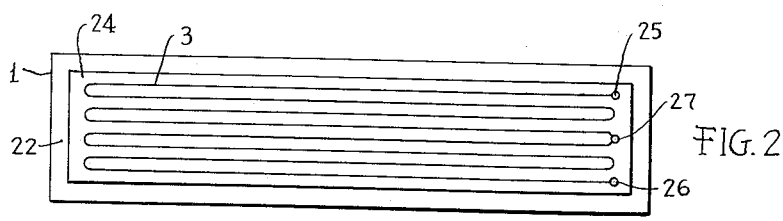
FIG. 2 illustrates circumferential orientation of a strain gauge as applied to a deformable band of FIG. 1.

With particular reference to FIG. 2, the bonded resistance strain gauge 3 is applied to a surface 22 of band 1, for example, by conventional techniques. The usual care must be exercised to insure electrical insulation of the gauge. A layer 24 of shellac, resinous cement, or the like, may be employed for both bonding and insulation of the gauge 3. Gauges 4, 5 and 6 are preferably identical to gauge 3 and are applied respectively to band surfaces 20, 23, and 21 in the same manner. While each gauge may be of the wire type, the foil type is preferred because of its improved heat dissipation properties. Of course, a number of shorter strain gauges arranged mechanically and electrically in series may be substituted for each single gauge 3 to 6. Although the illustrated circumferential arrangement of the gauges is most advantageous, some deviation therefrom will not result in a radically different mode of operation for the null-balance voltage source. It is to be understood, however, that the several strain gauges should have very nearly similar electrical and mechanical characteristics.

Each gauge, such as 3, should be provided with end terminals 25 and 26 for connection into the bridge circuit described in connection with FIG. 3 below. One or more intermediate terminals 27 may also be included for gross range changes or for varying the bridge impedance.

Figure 3:
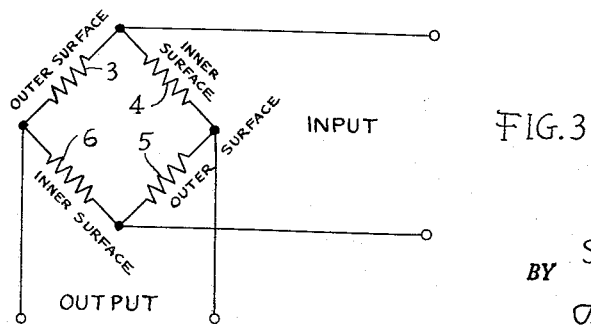
FIG. 3 illustrates a bridge circuit formed of the bonded strain gauges of FIG. 1.

FIG. 3 illustrates a connection of gauges 3, 4, 5 and 6, represented as resistances, in a bridge circuit with alternate bridge diagonals connected to input and output circuit terminals. Since inner and outer surface gauges are oppositely strained, the bridge unbalance may be varied continuously in either direction from its balanced condition. Input output signals may be D.C. or A.C., or of any other wave form.

It is important to recognize that this null-balance voltage source is inherently temperature stabilized; inner and outer surface pairs of gauges on the same band will be at the same temperature and temperature-resistance effects will be cancelled. If desired, the unit can be completely immersed in oil for maximum temperature compensation and the additional advantages of minimum friction. Since there is no wiper surface contact with the resistance elements, servo hunting attrition is eliminated resulting in maximum reproducibility and useful life span even without oil immersion.

While a specific preferred embodiment has been illustrated and described, various modifications will be apparent to those skilled in the art and no limitation is to be inferred beyond those inherent in the claims.

What is claimed:

1. A device for use as a null balance voltage source comprising a base, a fixed block and a pillow block attached to said base, a shaft rotatably supported by and translationally fixed with respect to said fixed and pillow blocks, said shaft being threaded for at least a portion of its length, a movable block threadedly engaging said shaft, first and second similar, concentric, discontinuously cylindrical bands of resilient material each having opposite end portions mounted respectively upon said fixed and movable blocks for relative translation therewith, a resistance strain gauge bonded circumferentially to each inner and outer cylindrical surface of said bands, circuit means interconnecting said gauges in a bridge network having four arms, an input diagonal and an output diagonal, adjacent arms of said bridge comprising respectively one of said gauges bonded to an outer surface and one of said gauges bonded to an inner surface of said bands, rotatable mechanical input means secured to said shaft, said base being apertured to define a longitudinal slot extending tangentially of said bands between said fixed and pillow blocks, and means attached to said movable block cooperating with said slot preventing rotation of said movable block.

2. A device for use as a null balance voltage source comprising first and second discontinuous cylindrical bands of a resilient material, a resistance strain gauge bonded to each inner and outer cylindrical surface of said bands, mechanically responsive means altering the radii of curvature of said bands, and circuit means interconnecting said gauges in a bridge network having four arms, an input diagonal and an output diagonal, adjacent arms of said bridge comprising respectively one of said gauges bonded to an outer surface and one of said gauges bonded to an inner surface of said bands.

3. A device for use as a null balance voltage source comprising first and second discontinuous cylindrical bands of a resilient material, a resistance strain gauge bonded to each inner and outer cylindrical surface of said bands, mechanically responsive means altering the radii of curvature of said bands, and circuit means interconnecting said gauges in a bridge network having four arms, an input diagonal and an output diagonal, said mechanically responsive means including first and second blocks translationally fixed with respect to first and second ends of said bands, and a shaft translationally fixed with respect to one of said blocks and threadedly engaging the other of said blocks, whereby rotation of said shaft causes relative translation of said ends of said bands.

References Cited in the file of this patent

UNITED STATES PATENTS 2,458,354     De Forest _____ Jan. 4, 1949
2,682,170     Hathaway _____ June 29, 1954